(12) United States Patent  (10) Patent No.: US 7,674,160 B1
Wheeler  (45) Date of Patent: Mar. 9, 2010

(54) GAMBREL

(76) Inventor: Lance E. Wheeler, 6680 W. Deerfield Rd., Remus, MI (US) 49340-9617

( * ) Notice: Subject to any disclaimer, the term of this patent is extended or adjusted under 35 U.S.C. 154(b) by 0 days.

(21) Appl. No.: 11/764,058

(22) Filed: Jun. 15, 2007

Related U.S. Application Data

(60) Provisional application No. 60/814,135, filed on Jun. 16, 2006.

(51) Int. Cl.
  *A22B 1/00* (2006.01)
(52) U.S. Cl. .................................................... 452/102
(58) Field of Classification Search ......... 452/187–193; 212/180, 294, 299; 414/462, 540, 541–543; 254/329, 332, 334; 294/81.1–81.5, 81.51, 294/19.1, 19.3, 24, 67.1–67.3, 67.31, 67.32
  See application file for complete search history.

(56) References Cited

U.S. PATENT DOCUMENTS

| 892,719 | A | | 7/1908 | Gratton |
| 916,010 | A | | 3/1909 | Poist |
| 1,117,436 | A | | 11/1914 | Person |
| 2,411,856 | A | * | 12/1946 | Harding ...................... 452/192 |
| 2,750,224 | A | | 6/1956 | Matheny |
| 3,395,768 | A | * | 8/1968 | Benbow ...................... 177/225 |
| 4,615,077 | A | | 10/1986 | Beebe |
| 4,763,942 | A | | 8/1988 | Lyon |
| 5,071,389 | A | | 12/1991 | Castle |
| 5,263,675 | A | * | 11/1993 | Roberts et al. ........... 248/219.4 |
| 5,288,265 | A | | 2/1994 | Beason |
| D345,780 | S | | 4/1994 | Ream |
| 5,304,091 | A | | 4/1994 | Wilkinson |
| 5,562,534 | A | | 10/1996 | McGough |
| 5,591,077 | A | | 1/1997 | Rowe |
| 5,820,455 | A | | 10/1998 | Breedlove |
| 5,873,776 | A | | 2/1999 | Klepac |
| 5,938,521 | A | * | 8/1999 | Jasek et al. ................. 452/192 |
| 6,045,442 | A | | 4/2000 | Bounds |
| 6,186,882 | B1 | | 2/2001 | Adams |
| 6,264,544 | B1 | | 7/2001 | Mullins |
| D462,416 | S | | 9/2002 | Dallas |
| 6,565,426 | B2 | | 5/2003 | Mayhew |
| 6,739,964 | B2 | | 5/2004 | Gearhart |
| D502,756 | S | | 3/2005 | Birdwell |
| 6,974,374 | B1 | | 12/2005 | Teinert |
| 6,988,944 | B1 | | 1/2006 | Syers |
| 6,994,618 | B1 | * | 2/2006 | Syers ......................... 452/187 |

* cited by examiner

*Primary Examiner*—Thomas Price
(74) *Attorney, Agent, or Firm*—Farris Law, P.C.; Robert L. Farris

(57) ABSTRACT

The gambrel includes a center bar, a left hook bar and a right hook bar. The center bar is a flat metal plate with a pivot pin bore, a support line bore and a stop pin bore. The left and right hook bars are elongated flat bars each of which has a hook pivot bore a pivot end, and a hook end. A pivot bolt passes through the left hook bar, through the center bar and through the right hook bar. A pivot bolt nut holds the center bar between the left and right hook bars. A stop bolt passes through the stop pin bore between the hook pivot pin bore and the center bar lower end. The left hook bar rests on the stop bolt and the right hook bar rests on the stop bolt nut when the hook bars are in a carcass support position.

10 Claims, 4 Drawing Sheets

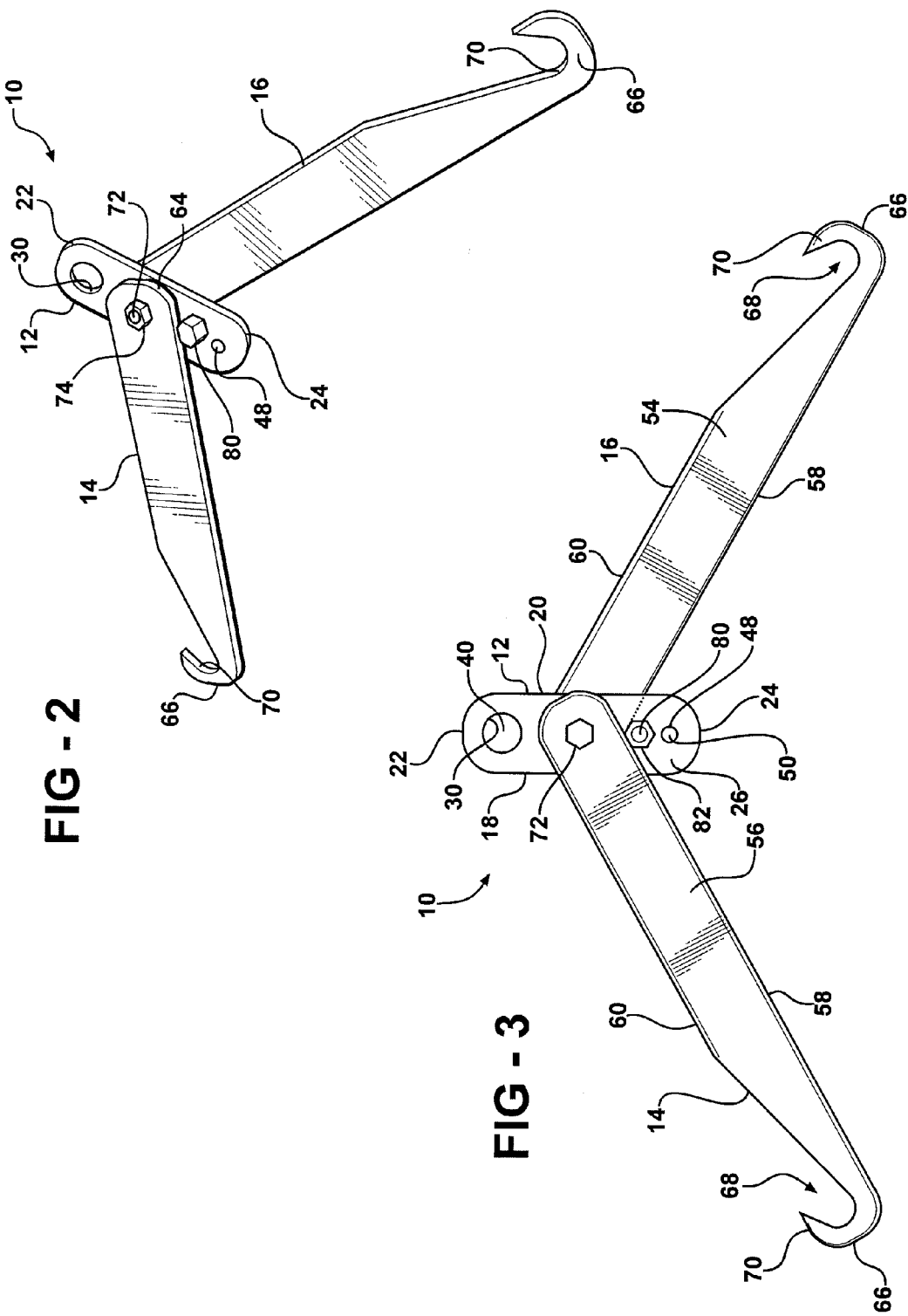

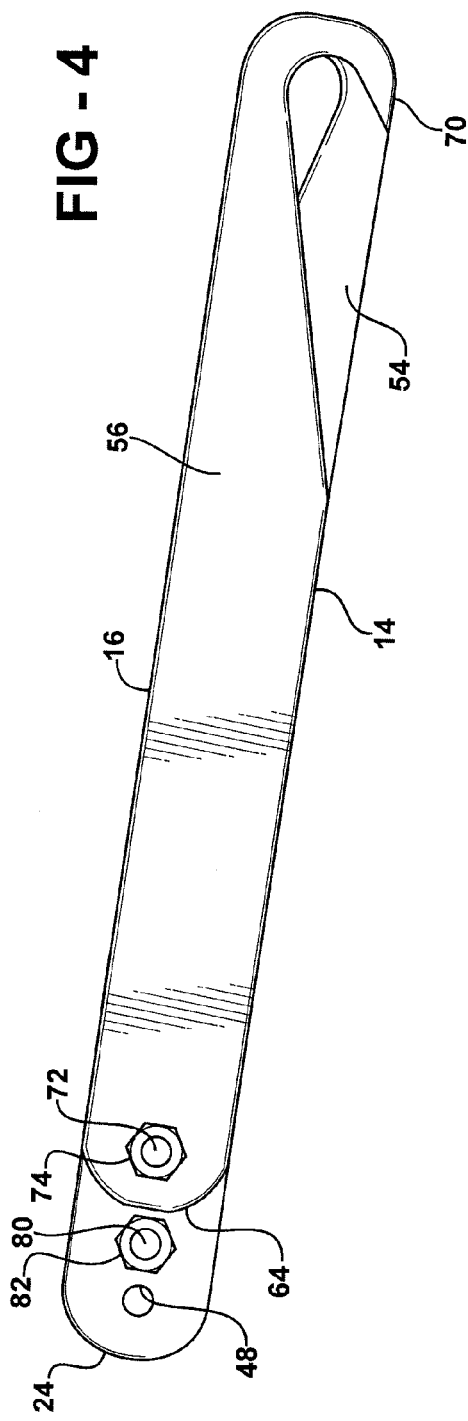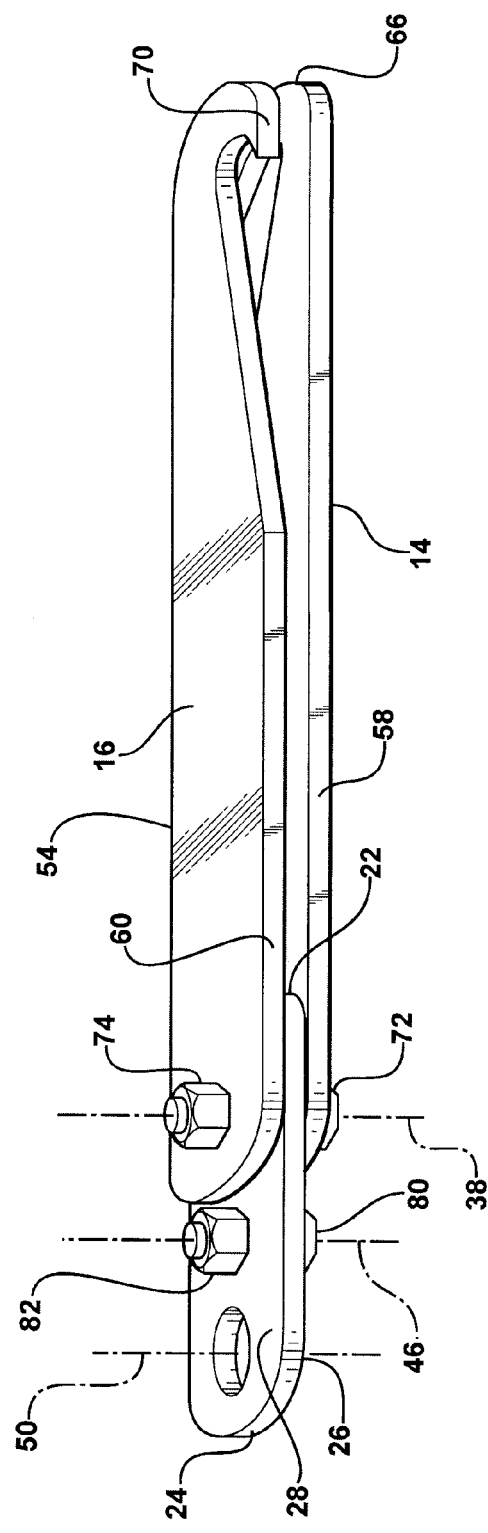

GAMBREL

CROSS REFERENCE TO RELATED APPLICATIONS

This application claims the benefit of the filing date of U.S. Provisional Application No. 60/814,135 titled GAMBREL filed Jun. 16, 2006

TECHNICAL FIELD OF THE INVENTION

This invention relates to a gambrel that is carried by a hunter while hunting large game.

BACKGROUND OF THE INVENTION

Large game including deer, elk, caribou and moose are at least partially cleaned shortly after they are killed by a hunter. The meat may taste better if the carcass is at least partially cleaned in the field shortly after the animal is killed. When hunting in remote areas it may be necessary to cut an animal carcass into multiple pieces to facilitate transport of the meat.

Gambrels are employed to hold a carcass up by the rear legs while it is cleaned and if necessary butchered. The gambrel is raised by a rope or cable after the rear legs are attached.

A substantial number of gambrel structures are known. Some gambrels do not fold up and therefore have relative large overall dimensions making them difficult to carry. Gambrels that fold or telescope generally have hooks some of which have sharp points or edges that may cause injury to individuals that carry or use them. Others have exposed hooks that catch on vines, bushes, or tree limbs and impede movement to and from hunting locations.

Folding gambrels with tension links as well as compression links are known. These gambrels have excessive numbers of parts that increase weight and may have reduced strength. Multiple pivot pins are required. Each pivot pin increases weight and cost. Multiple pivot pins also increase the potential for failures.

SUMMARY OF THE INVENTION

The gambrel includes a center bar and two hook bars. The center bar has a center bar upper end, a center bar lower end, a center bar front surface, a center bar rear surface, a center bar first side and a center bar second side. The center bar rear surface is parallel to the center bar front surface. A hook pivot pin bore passes through the center bar. A pivot bore axis of the hook pivot pin bore is perpendicular to the center bar front surface. The pivot bore axis is also midway between the center bar first side and the center bar second side.

A winch line bore passes through the center bar. A winch line bore axis is parallel to the pivot bore axis, and positioned between the pivot bore axis and the center bar upper end.

A stop pin bore passes through the center bar. The stop pin bore has a stop pin bore axis that is parallel to the pivot bore axis and is positioned between the pivot bore axis and the center bar lower end.

A first elongated flat hook bar has a hook bar first flat surface, a hook bar second flat surface, a hook bar first edge, and a hook bar second edge. A hook pivot bore passes through the first elongated flat hook bar adjacent to a hook pivot end. A hook on the hook end of the first hook bar is formed by a U-shaped groove with a groove open end that passes through a portion of the hook bar second edge.

A second elongated flat hook bar has a hook bar first flat surface, a hook bar second flat surface, a hook bar first edge and a hook bar second edge. A hook pivot bore passes through the second elongated flat hook bar adjacent to a hook pivot end. A hook on a hook bar hook end is formed by a U-shaped groove with a groove open end that removes a portion of the hook bar second edge.

A pivot bolt passes through the hook pivot bore of the first elongated flat hook bar, through the hook pivot pin bore through the center bar and through the hook pivot bore through the second elongated flat hook bar. A pivot bolt nut is received on the pivot bolt and holds the hook bar second flat surface of the first elongated flat hook bar in engagement with a portion of the center bar rear surface. The pivot bolt and pivot bolt nut also hold the hook bar second flat surface of the second elongated flat hook bar in engagement with a portion of the center bar front surface.

A stop bolt passes through the stop pin bore and a stop bolt nut received on the stop bolt clamps the stop bolt to the center bar. the first edge of the first elongated flat hook bar and the first edge of the second elongated flat hook bar engage the stop bolt and stop bolt nut when the gambrel is in position to support an animal carcass.

The first elongated flat hook bar and the second elongated flat hook bar pivot in opposite directions about the pivot bore axis and away from the stop bolt and stop bolt nut toward a folded position in which both ends of the winch line bore are covered. In the folded position for carrying or storage the groove open end of the first elongated flat hook bar and the groove open end of the second elongated flat hook bar are substantially closed.

An auxiliary stop pin bore through the center bar may be provided. The auxiliary stop pin bore is positioned between the stop pin bore and the center bar lower end. This auxiliary stop pin bore may be employed to receive a retainer line that secures the gambrel when the gambrel is being carried.

BRIEF DESCRIPTION OF THE DRAWINGS

Objects, features and advantages of this invention will become readily apparent in view of the following detailed description of the preferred embodiments and best mode, appended claims and accompanying drawings, in which:

FIG. 2 is a reduced perspective view of the gambrel in a use position;

FIG. 3 is an elevation view of the gambrel in a use position;

FIG. 4 is a front elevational view of the gambrel in a folded transport and storage position;

FIG. 5 is a perspective view of the gambrel in the folded position; and

DETAILED DESCRIPTION OF THE PREFERRED EMBODIMENTS

Figure 1:
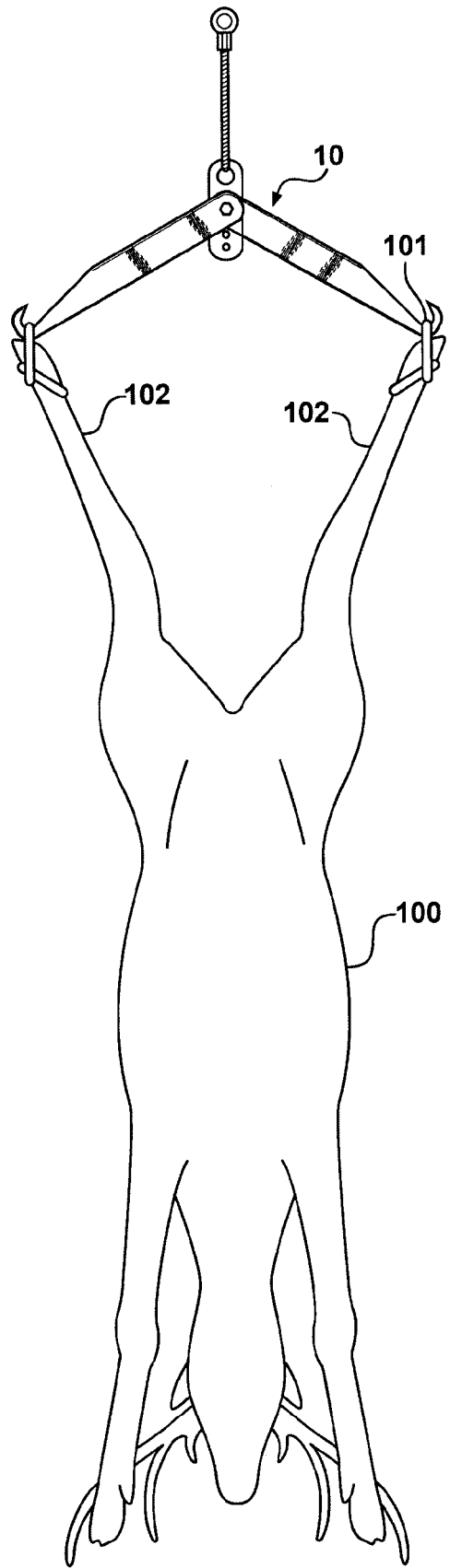
FIG. 1 is a reduced elevational view of the gambrel supporting an animal carcass.

The gambrel 10 includes a center bar 12, a left hook bar 14 and a right hook bar 16. The center bar 12 is a flat generally rectangular bar with parallel sides 18 and 20, an arcuate upper end surfaces 22 and an arcuate lower end surface 24. The front surface 26 is a generally flat surface. The rear surface 28 is a generally flat surface that is parallel to the front surface 26.

A winch bore 30 passes through the center bar 12. The winch bore is normal to front surface 16, midway between the sides 18 and 20 and below the arcuate upper end surface 22. Both ends of the winch bore 30 have chamfers 32. The bore 30 receives a rope, cable, hook or the pin of a clevis that supports the gambrel 10 and a carcass 100 attached to the gambrel. The chamfers 32 reduce the possibility of damage to a rope used to support the gambrel 10. A hook pivot pin bore 34 passes through the center portion of the center bar 12. The pivot pin bore 34 has a pivot bore axis 38 that is parallel to the winch bore axis 40. The pivot bore axis 38 is mid way between the sides 18 and 20 as well as the upper end surface 22 and the lower end surface 24. A first stop pin bore 44 passes through center bar 12 below the pivot pin bore 34. A first stop bore axis 46 is parallel to the pivot bore axis 38, mid way between the sides 18 and 20, and mid way between the pivot bore axis 38 and the lower end surface 24. A second stop pin bore 48 passes through the center bar 12 below the first stop pin bore 44. A second stop bore axis 50 is parallel to the pivot bore axis 38, midway between the sides 18 and 20, and midway between the first stop bore axis 46 and the lower end surface 24, and midway between the sides 18 and 20 of the center bar 12.

The left hook 14 is an elongated flat bar 52. The flat bar 52 has a first flat surface 54, a second flat surface 56, a first edge 58 and a second edge 60. A hook pivot bore 62 passes through the flat bar 52 near the hook pivot end 64. A hook end 66 of the flat bar 54 faces away from the hook pivot end 64. A U-shaped groove 68 is formed in the flat bar 52. The U-shaped groove forms a hook 70 with an opening that faces toward the pivot end 64 and passes through the second edge 60.

Figure 6:
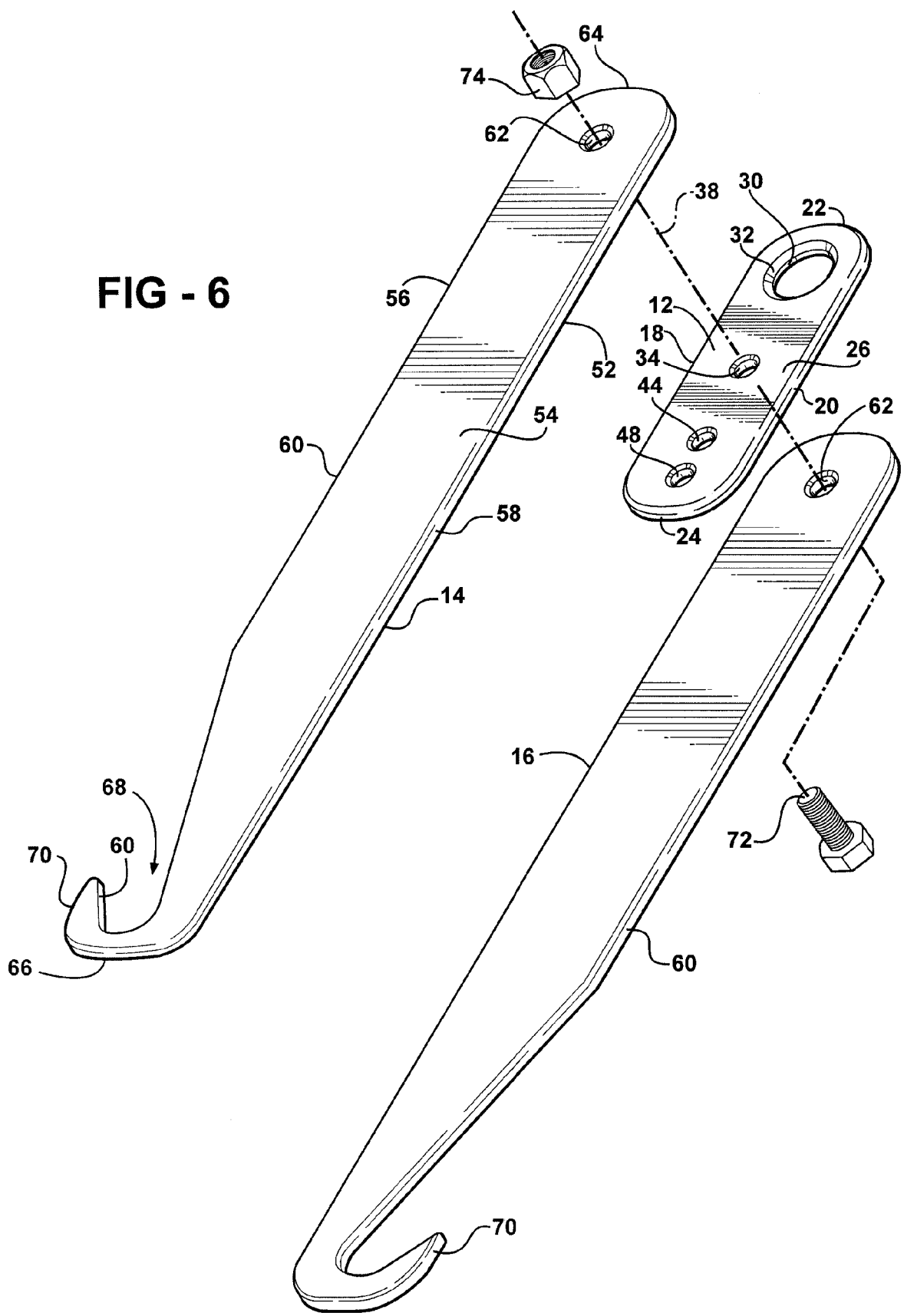
FIG. 6 is an expanded view of the gambrel.

The right hook 16 is identical to the left hook 14 described above. The right hook 16 is rotated 180° about the long axis from the left hook 14 when pivotally attached to the center bar 12 as shown in FIG. 6.

A pivot bolt 72 passes through the hook pivot bore 62 of the left hook bar 14, through the pivot pin bore 34 through the center bar 12 and through the pivot bore 62 through the right hook bar 16. A nut 74 is screwed on to the pivot bolt 72 to hold the two hook bars 14 and 16 and the center bar 12 together as one assembly. The nut 74 is preferably a lock nut that retains the pivot bolt in place while permitting the hook bars 14 and 16 to pivot relative to each other and relative to the center bar 12. The pivot bolt 72 could be a pivot pin and washers held in place by cotter pins if desired. A pivot pin with one or two transverse bores which receive a steel roll pin is another possible retainer system. A further possible pivot bolt 72 is a bolt with a pivot portion a shoulder that axially positions the nut 74 on a threaded end of the bolt with a reduce diameter relative to the pivot portion.

A stop bolt 80 passes through the first stop pin bore 44 or the second stop pin bore 48 through the center bar 12. A stop bolt nut 82 screws onto the stop bolt 80 and is tightened to fix the position of the stop bolt relative to the center bar 12. When the stop bolt 80 is in the first stop pin bore 44, the hooks 70 of the left hook bar 14 and the right hook bar 16 are a substantial distance apart as shown in FIG. 1. The left hook bar 14 rests on the head of the stop bolt 80 as shown in FIG. 2. The right hook bar 16 rests on the stop bolt nut 82 when the right hook bar is in a working position. Moving the stop bolt 80 to the second stop pin bore 48 moves the left and right hooks 70 closer together when in the working position.

The winch bore 30 through the center bar 12 is above the pivot bolt 72 and open to receive a rope or winch line connector that supports an animal carcass when the gambrel 10 is in a use position as shown in FIG. 1. The winch bore 30 is covered by the left hook bar 14 and the right hook bar 16, when the gambrel 10 is in a folded transport and storage position, as shown in FIG. 4. The second stop pin bore 48 is open to receive a retainer line or hook while the gambrel 10 is being carried or stored. If the stop bolt 80 is moved to the stop pin bore 48, the stop pin bore 44 is free to receive a retainer line or hook.

The entries into the hooks 70 are closed when the hook bars 14 and 16 are in the folded transport and storage position as shown in FIGS. 4 and 5. The possibility of one of the hooks catching on something while being carried through trees and bushes is substantially reduced.

Moving the bolt 80 from the stop pin bore 44 to the stop pin bore 48 will make a large difference in the distance between the hooks 70 as stated above. Most adjustments in the distance between two of the hooks 70 will be much smaller. Two hooks 70 can be moved closer together by employing a bolt 80 with a smaller hexagon head and a nut 82 with a corresponding size. A bolt 80 with a larger head and a nut 82 with a size corresponding to the larger head size can move the two hooks 70 farther apart. Washers with selected outside diameters can be clamped to the front and rear surfaces 26 and 28 respectively of the center bar 12 by the bolt 80 and nut 82 to obtain a range of adjustments. The radially outer surfaces of the washers contact the left and right hook bars 14 and 16 respectively to adjust the space between two hooks 70 when in the use position shown in FIGS. 1, 2 and 3.

To move the left hook bar 14 and the right hook bar 16 from the use position shown in FIGS. 1, 2 and 3, the hooks 70 on the ends of the hook bars are both pivoted away from the bolt 80 and nut 82. Each hook bar 14 and 16 is pivoted relative to the pivot bore axis 38 well over 90° to the folded position shown in FIGS. 4 and 5.

A hoof holder 101 is shown in FIG. 1. Each of the hoof holders 101 holds the hoof of one rear leg 102. The hoof holders 101 are held by the hooks 70 of the Gambrel 10. When the hoof holders 101 are not employed, the point of each hook 70 is forced between the tibia and the fibula of a rear leg 102 of a carcass 100 to secure both rear legs to the gambrel.

The gambrel 10 is preferably made from a light weight material such as aluminum. Titanium is another light weight material that would work well. However, the center bar 12, the left hook bar 14 and the right hook bar 16 are relatively thin material and would most likely be lighter than known gambrels even if made from steel.

I claim:

1. A gambrel comprising:
   a center bar having a center bar upper end, a center bar lower end, a center bar front surface and a center bar rear surface;
   a left elongated hook bar having a left hook end and a left hook pivot end;
   a right elongated hook bar having a right hook end and a right hook pivot end;
   a pivot pin pivotally attaching the left hook pivot end and the right hook pivot end to the center bar with the center bar between the left elongated hook bar and the right elongated hook bar;
   a first stop anchored to the center bar, between the pivot pin and the center bar lower end, and engaging the left elongated hook bar to limit counter clockwise rotation of the left elongated hook bar about the pivot pin and thereby hold the left elongated hook bar in a carcass supporting position;
   a second stop attached to the center bar, between the pivot pin and the center bar lower end, and engaging the right elongated hook bar to limit clockwise rotation of the right elongated hook bar about the pivot pin and thereby hold the right elongated hook bar in a carcass supporting position;
   a left hook groove in the left hook end with a left hook groove bottom that faces upwardly when the left elongated hook bar is in the carcass supporting position; and a right hook groove in the right hook end with a right hook groove bottom that faces upwardly when the right elongated hook bar is in the carcass supporting position.

2. A gambrel, as set forth in claim 1, wherein the first stop is a bolt head and the second stop is a nut.

3. A gambrel comprising:
a center bar having a center bar upper end, a center bar lower end, a center bar front surface and a center bar rear surface;
a left elongated hook bar having a left hook end and a left hook pivot end;
a right elongated hook bar having a right hook end and a right hook pivot end;
a pivot pin pivotally attaching the left hook pivot end and the right hook pivot end to the center bar with the center bar between the left elongated hook bar and the right elongated hook bar;
a stop in anchored to the center bar and engaging both the left elongated hook bar and the right elongated hook bar to limit counter clockwise rotation of the left elongated hook bar about the pivot pin and to limit clockwise rotation of the right elongated hook bar about the pivot pin thereby holding the left elongated hook bar and the right elongated hook bar in a carcass supporting position;
a left hook groove in the left hook end with a left hook groove bottom that faces upwardly when the left elongated hook bar is in the carcass supporting position; and
a right hook groove in the right hook end with a right hook groove bottom that faces upwardly when the right elongated hook bar is in the carcass supporting position.

4. A gambrel, as set forth in claim 3, including a gambrel support line bore through the center bar positioned between the pivot pin and the center bar upper end.

5. A gambrel, as set forth in claim 4, wherein the left elongated hook bar covers the gambrel support line bore on center bar front side when the left elongated hook bar is in a folded storage position; and
the right elongated hook bar covers the gambrel support line bore on the center bar rear side when the right elongated hook bar is in a folded storage position.

6. A gambrel, as set forth in claim 3, wherein the stop pin is positioned between the pivot pin and the center bar lower end.

7. A gambrel comprising:
a center bar having a center bar upper end, a center bar lower end, a center bar front surface a center bar rear surface that is parallel to the center bar front surface, a center bar first side, and a center bar second side;
a winch line bore passing through the center bar and having a winch line bore axis that is parallel to the pivot bore axis and positioned between the pivot bore axis and the center bar upper end;
a stop pin bore passing through the center bar and having a stop pin bore axis that is parallel to the pivot bore axis and positioned between the pivot bore axis and the center bar lower end;
a first elongated flat hook bar having a hook bar first flat surface, a hook bar second flat surface, a hook bar first edge, a hook bar second edge, a hook pivot bore passing through the first elongated flat hook bar adjacent to a hook pivot end, and a hook on a hook bar hook end formed by a u-shaped groove with a groove open end that removes a portion of the hook bar second edge;
a second elongated flat hook bar having a hook bar first flat surface, a hook bar second flat surface, a hook bar first edge, a hook bar second edge, a hook pivot bore passing through the second elongated flat hook bar adjacent to a hook pivot end, and a hook on a hook bar hook end formed by a u-shaped groove with a groove open end that removes a portion of the hook bar second edge;
a pivot bolt passing through the hook pivot bore of the first elongated flat hook bar, through the hook pivot pin bore through the center bar, through the hook pivot bore through the second elongated flat hook bar, and a pivot bolt nut received on the pivot bolt and holding the hook bar second flat surface of the first elongated flat hook bar in engagement with a portion of the center bar rear surface, and holding the hook bar second flat surface of the second elongated flat hook bar in engagement with a portion of the center bar front surface;
a stop bolt passing through the stop pin bore and a stop bolt nut received on the stop bolt and clamping the stop bolt to the center bar; and
wherein the first edge of the first elongated flat hook bar and the first edge of the second elongated flat hook bar engage the stop bolt and stop bolt nut when the gambrel is in a carcass support position to support an animal carcass and wherein the first elongated flat hook bar and the second elongated flat hook bar pivot in opposite directions about the pivot bore axis and away from the stop bolt and stop bolt nut toward a folded position in which both ends of the winch line bore are covered and the groove open end of the first elongated flat hook bar and the groove open end of the second elongated flat hook bar are substantially closed.

8. A gambrel as, set forth in claim 7, including an auxiliary stop pin bore through the center bar positioned between the stop pin bore and the center bar lower end.

9. A gambrel, as set forth in claim 8 wherein the auxiliary stop pin bore is open to receive retainer lines when the gambrel is being carried.

10. A gambrel, as set forth in claim 7, wherein each of the first elongated flat hook bar and the second elongated flat hook bar pivot more that 100° when moved from the carcass support position to the folded position.

* * * * *